United States Patent
Gizis et al.

(10) Patent No.: US 10,148,732 B2
(45) Date of Patent: Dec. 4, 2018

(54) SECURE REMOTE COMPUTER NETWORK

(71) Applicant: Connectify, Inc., Philadelphia, PA (US)

(72) Inventors: Alexander Gizis, Philadelphia, PA (US); Brian Prodoehl, Plymouth Meeting, PA (US); Kevin Cunningham, Swarthmore, PA (US); Brian Lutz, Reading, PA (US)

(73) Assignee: Connectify, Inc., Philadelphia, PA (US)

( * ) Notice: Subject to any disclaimer, the term of this patent is extended or adjusted under 35 U.S.C. 154(b) by 136 days.

(21) Appl. No.: 14/976,565

(22) Filed: Dec. 21, 2015

(65) Prior Publication Data

US 2016/0112495 A1    Apr. 21, 2016

Related U.S. Application Data

(63) Continuation-in-part of application No. 14/765,115, filed as application No. PCT/US2013/025559 on Feb. 11, 2013.

(60) Provisional application No. 61/596,883, filed on Feb. 9, 2012.

(51) Int. Cl.
*H04L 12/26* (2006.01)
*H04L 29/08* (2006.01)
*H04L 29/06* (2006.01)

(52) U.S. Cl.
CPC .............. *H04L 67/06* (2013.01); *H04L 67/18* (2013.01); *H04L 69/14* (2013.01); *H04L 43/0829* (2013.01); *H04L 43/0852* (2013.01)

(58) Field of Classification Search
CPC ......... H04L 67/06; H04L 67/18; H04L 69/14; H04L 43/0852; H04L 43/0829
See application file for complete search history.

(56) References Cited

U.S. PATENT DOCUMENTS

| | | | |
|---|---|---|---|
| 5,969,632 A | 10/1999 | Diamant et al. | |
| 8,125,989 B2 | 2/2012 | Kissel | |
| 8,825,964 B1 * | 9/2014 | Sopka | G06F 3/0671 |
| | | | 711/152 |
| 8,954,591 B2 | 2/2015 | Ganesan et al. | |
| 2002/0023210 A1 | 2/2002 | Tuomenoksa et al. | |
| 2002/0122228 A1 * | 9/2002 | Rappaport | H04L 43/026 |
| | | | 398/98 |
| 2003/0079018 A1 | 4/2003 | Lolayekar et al. | |
| 2003/0140084 A1 | 7/2003 | D'Angelo | |
| 2004/0049702 A1 | 3/2004 | Subramaniam et al. | |
| 2005/0180460 A1 * | 8/2005 | Hirano | H04L 47/10 |
| | | | 370/469 |

(Continued)

OTHER PUBLICATIONS

International Search Report and Written Opinion issued in related application PCT/US2013/025559 dated Apr. 23, 2013.

(Continued)

*Primary Examiner* — Khoi V Le

(74) *Attorney, Agent, or Firm* — Stradley Ronon Stevens & Young, LLP

(57) ABSTRACT

A method of distributing data over multiple Internet connections is provided. The method includes the steps of: (a) providing a client computer with access to a plurality of Internet connections; and (b) providing a host computer for determining the allocation of data to be sent to the client computer over each of the plurality of Internet connections using at least one of (i) predetermined criteria and (ii) dynamically changing criteria.

11 Claims, 10 Drawing Sheets

(56) References Cited

U.S. PATENT DOCUMENTS

| | | | |
|---|---|---|---|
| 2007/0019619 A1 | 1/2007 | Foster et al. | |
| 2008/0101460 A1* | 5/2008 | Rodriguez | H04N 21/2385 375/240.01 |
| 2008/0253282 A1 | 10/2008 | Kissel | |
| 2009/0003384 A1* | 1/2009 | Rozental | H04L 12/2801 370/485 |
| 2009/0285175 A1 | 11/2009 | Nix | |
| 2009/0322893 A1* | 12/2009 | Stallings | H04N 1/00132 348/222.1 |
| 2010/0138909 A1* | 6/2010 | Chen | H04L 63/0209 726/11 |
| 2010/0145947 A1* | 6/2010 | Kolman | G06F 17/3087 707/736 |
| 2011/0047583 A1* | 2/2011 | Howard | H04W 8/30 725/109 |
| 2011/0138458 A1 | 6/2011 | Kumar et al. | |
| 2011/0258453 A1* | 10/2011 | Mansfield | H04L 63/0823 713/173 |
| 2011/0274264 A1 | 11/2011 | Zhang | |

OTHER PUBLICATIONS

Ishac, Joseph, et al., On the Performance of TCP Spoofing in Satellite Networks, Military Communications Conference, 2001 (MILCOM, 2001), pp. 700-704, vol. 1, IEEE. http://www.icir.org/mallman/pubs/IA01/1A01.pdf.

* cited by examiner

| INTERNET CONNECTION 1 – WiFi UNLIMITED USE | |
| --- | --- |
| PRIORITY | |
| ALWAYS: USE WHENEVER CONNECTED – BEST FOR UNLIMITED CONNECTIONS | ● |
| SECONDARY: USE LESS THAN "ALWAYS" CONNECTION – BEST FOR CONNECTIONS WITH DATA LIMITS | ○ |
| BACKUP: USE WHENEVER CONNECTED – BEST FOR UNLIMITED CONNECTIONS | ○ |
| NEVER: NEVER USE THIS CONNECTION | ○ |
| USAGE LIMIT | |
| LIMIT: --- GB | |

FIG. 10A

| INTERNET CONNECTION 2 – 4G 1.3 GB (65%) OF 2 GB USED | |
| --- | --- |
| PRIORITY | |
| ALWAYS: USE WHENEVER CONNECTED – BEST FOR UNLIMITED CONNECTIONS | ○ |
| SECONDARY: USE LESS THAN "ALWAYS" CONNECTION – BEST FOR CONNECTIONS WITH DATA LIMITS | ● |
| BACKUP: USE WHENEVER CONNECTED – BEST FOR UNLIMITED CONNECTIONS | ○ |
| NEVER: NEVER USE THIS CONNECTION | ○ |
| USAGE LIMIT | |
| LIMIT: 2.0 GB | |

FIG. 10B

SECURE REMOTE COMPUTER NETWORK

CROSS-REFERENCE TO RELATED APPLICATIONS

This application is a continuation in part of U.S. patent application Ser. No. 14/765,115 filed Jul. 31, 2015, which is a U.S. National Phase of International Application No. PCT/US2013/025559 filed Feb. 11, 2013, which claims the benefit of priority to U.S. Provisional Patent Application No. 61/596,883 filed on Feb. 9, 2012, the contents of which are incorporated in this application by reference.

FIELD OF THE INVENTION

The present invention relates generally to the field of computer networks, and in more particularity, relates to secure, high speed networking between two or more computers using insecure public or private network connections. The secure, remote network provides for the configuration of an encrypted "tunnel" on a user's private network for data packets to pass through an insecure public network without risk of exposure.

BACKGROUND OF THE INVENTION

Computers can communicate with one another only when connected together using some form of a communications network. The Internet is one such network, which has grown extensively over the past decade, and has the distinct advantage of being able to connect computers together from anywhere in the world. Another type of communications network are local area networks ("LAN"), which are private networks that typically exist between only a few trusted computers, usually in an office or home. A further example of a computer communications network is a wide area network ("WAN"), which is usually used as a means of communications access to the Internet via a wireless radio protocol.

There are many possible reasons to want remote computers to join a LAN. A LAN itself is often secure, it may contain or have access to important corporate resources at the office, or access to one's personal media or data files in a residential setting. However, once a user attaches to a LAN via a direct Internet connection, the LAN is no longer secure. For this reason, the Virtual Private Network ("VPN") was created. The VPN is software that appears to be another LAN adapter, but uses encryption technology and methods, and Internet connections, to bridge remote computers onto a local area network, without risk of directly connecting the LAN to the public and insecure Internet.

FIG. 1 illustrates a prior art classic Virtual Private Network 100. In such a network, predefined or rolling algorithms allow a secure connection between a computer 102 and a corporate server 116. This connection is made over any network 114, which may also be the Internet, with security managed by the VPN layer on the client 108 and the server 118. Any software clients 104 on the client computer 102 will see the VPN client 108 as a virtual network interface 106, appearing no different than the driver for a physical network interface 112. The VPN encapsulates all traffic sent to it as encrypted, private data, then sends it via a standard network interface and driver 110 to a physical network interface device 112, such as a Wi-Fi or Ethernet device.

The VPN data is secure over the unsecured network 114, using strong encryption. This type of encryption is superior to other standard forms of encryption, because even the structure of the data is hidden from any resource outside of the VPN. The classic VPN typically has pre-shared keys; an administrator will create encryption keys for each client computer 102, which are also known to the server 116. This prevents unauthorized users of the same VPN technology to connect, and it allows an administrator to de-authorize any given user. Some simple VPNs use only a single shared key for all connections.

The classic prior art VPN routes data to a server 116, which is also physically interfaced 112 to the external, insecure network 114. The server 116 communicates via an driver interface 110 to the server part of the VPN 118. It is only within this part of the system that the encrypted data is decrypted. In the classic VPN, the VPN server 118 is responsible for authenticating VPN clients 108. It will, of course, reply to said clients with encrypted packets, so the communication and traffic is encrypted in both signal directions and is two-way secure.

On the server 116, the VPN server 118 will also appear as a normal networking device to the server host operating system ("OS"), allowing access to the server's network software layer 110 and network software clients 104 within the server computer, and usually, out via a physical interface 112 to a secure corporate network 120.

The effect of the classic prior art VPN is that the remote client computer 104 behaves as if it is in the same building, connected to the secure corporate network 120, as the server 118 and other client computers 104. Yet, the data from the client 104 is secure, and the corporate network 120 is not subject to risk of attack via an open Internet 114 or other insecure connection. A big disadvantage of a classic VPN is its complexity of use. A network administrator is usually needed, to hand out keys, to manage firewalls, etc. Moreover, it is dependent on the central authority for all VPN certifications. Even in a business scenario, managing a VPN and keeping it functional for all remote users can be a complex and problematic task.

In response to these type of issues, and to enable simpler VPNs for home users, a new kind of VPN management has become popular. This new VPN eliminates some or all aspects of a single central server, replacing it with a central manager for VPN certifications, which will let VPN clients rendezvous with one another, but then, at least to some extent, run peer-to-peer as long as the VPN is operating. FIG. 2 illustrates an example prior art embodiment of this modified VPN 200, which has enjoyed some success as a personal VPN. In this architecture, there is no corporate intranet, simply clients 102 that wish to merge their local networks together via a VPN.

This network architecture still enlists a management server 202, but in this instance the server is only for management purposes. A client 102 will establish a connection to a web or similarly accessible front end 204, which will allow it to define a VPN connection and other clients. The web front end 204 informs the VPN Manager of the connection, and it proceeds to direct the clients to establishing a peer-to-peer, authenticated VPN connection.

Some VPNs designed this way will continue to route some traffic through the VPN Manager 206, while others drop the management interface entirely and leave the clients to operate entirely peer-to-peer.

Another limitation of the typical VPN user is the network itself. Some client devices may have multiple Internet connections: WAN, LAN, Wi-Fi, etc. But each of these connections are not necessarily useful at all times, particularly over the course of a day for a traveler. For example, while a Wi-Fi connection may be the best communication means at one location, a WAN may be better for signal transmission at a different location. It may be complex to switch the VPN from interface to interface, and there is usually no way to take advantage of the speed of multiple interfaces when they are available.

There is a history for using multiple physical interfaces and treating them as a single faster interface. This has historically been called "network bonding." The use of a bonded set of slower physical interfaces 112 to create one large, virtual interface is fairly well documented. FIG. 3 shows a typical prior art bonded network interconnect 300. In this system, there is a computer 102 with client applications 104 and a network interface layer 106 that needs to be connected to the Internet or other fast network 114. However, it only has access to slow connections 304.

Using either a network layer or a device layer abstraction 302, such a system splits network traffic in some agreed-upon way over multiple point-to-point connections, such as phone lines, to a service provider 306. That service provider 306 contains a similar network layer or device layer 302, which can reassemble the traffic, delivering it to a standard network layer protocol 110, and ultimately, interfaced 112 to the target network 114. Examples of this type of architecture include the Integrated Services Digital Network ("ISDN") standard, and various systems for bonding analog phone modems such as Microsoft Modem Bonding, FatPipe, and others.

To improve upon this prior art, a number of additional features can be built into a VPN system. A more flexible means of establishing the VPN connection, with the option of using readily available public resources and standards is a tangible advancement. Using standards allows the user a choice between public or private resources for this connection. A further goal of the inventive system is an even greater simplification of the VPN setup, and taking the need for a proprietary central server out of the system as a further improvement. A further objection and advancement is to establish a novel means by which the VPN can route through firewalls that can often hinder VPN use in the field. Yet another advancement allows dynamic use of any and all available interfaces, optimizing performance across all means of connection between two points on the VPN, and allowing rules to factor in the cost of any interface's use as well.

Based on the typical complexity of creating, establishing, and maintaining a VPN, there is plenty of room for improvement in this field. Specifically, a VPN can be created dynamically, without the need for expert configuration of the VPN, firewalls, routers, and other networking components. Coupling this with the ability to intelligently use all available bandwidth, and make the best of potentially faulty connections readily permits the ability to create a more ideal VPN for use by remote clients.

SUMMARY OF THE INVENTION

The primary elements of the secure remote computer network include means to configure an encrypted "tunnel" for data packets on a private network to pass through an insecure public network without risk of exposure. In preferred embodiments, the inventive systems and methods provide a robust and simple configuration mechanism, based on existing open standards for Internet "instant" messaging and media delivery that will remove the complexity and unreliability often associated with current VPNs.

More particularly, the present invention overcomes the disadvantages of the prior art and fulfills the needs described above by providing, in a preferred embodiment, a computer communications network system, comprising (a) at least one switchboard computer in a hub mode in communication connectivity with an external network; (b) at least one switchboard computer in a client mode in communication connectivity with an external network; and (c) a directory service in communication connectivity with an external network; wherein said at least one switchboard computer in a hub mode initiates a connection with said directory service to be registered and made available for said at least one switchboard computer in a client mode to dynamically communicate with said at least one switchboard computer in a hub mode through an external network. For example, the external network may be a global communications network, the Internet, etc.

Another embodiment of the present invention is a computer communications network system, comprising (a) at least one switchboard computer in a hub mode in communication connectivity with an external network (e.g., a global communications network), said at least one switchboard computer further comprising a discovery server to monitor external activity, a management data base to record current network communication statistics, a plurality of network address translators, a virtual network interface to communicate with a plurality of client computers, and a virtual private network to encrypt data prior to transmitting said encrypted data to one of said network address translators; (b) at least one switchboard computer in a client mode in communication connectivity with an external network, said at least one switchboard computer further comprising a discovery server to monitor external activity, a management database to record current network communication statistics, a plurality of network address translators, a virtual network interface to communicate with a plurality of client computers, and a virtual switch and router in communication connectivity with a virtual private network to encrypt data prior to transmitting said encrypted data to one of said network address translators; and (c) a directory service in communication connectivity with an external network; wherein said at least one switchboard computer in a hub mode initiates a connection with said directory service to be registered and made available for said at least one switchboard computer in a client mode to communicate with said at least one switchboard computer in a hub mode through an external network.

Still another embodiment of the present invention is a method for creating a flexible and secure network connection between two or more computers, having at least one switchboard computer in a hub mode in communication connectivity with an external network; and at least one switchboard computer in a client mode in communication connectivity with an external network; and a directory service in communication connectivity with an external network; the method comprising the steps of (a) initiating from said at least one switchboard computer in a hub mode a connection with said directory service; and (b) registering said at least one switchboard computer in a hub mode a connection with said directory service as available for said at least one switchboard computer in a client mode to dynamically communicate with said at least one switchboard computer in a hub mode through an external network.

Still another embodiment of the invention is a method of distributing data over multiple Internet connections. The method includes the steps of: (a) providing a client computer with access to a plurality of Internet connections; and (b) providing a host computer for determining the allocation of data to be sent to the client computer over each of the plurality of Internet connections using at least one of (i) predetermined criteria and (ii) dynamically changing criteria.

Still another embodiment of the invention is a method of selecting a host computer for allocating data to be sent over each of a plurality of Internet connections. The method includes the steps of: (a) providing a client computer with access to the plurality of Internet connections; (b) accessing a directory service computer based on a geographic location of the client computer; and (c) using the accessed directory service computer to select one of a plurality of host computers based on criteria, the criteria including at least one of (i) a relative geographic location between the client computer and the plurality of host computers, and (ii) current load test traffic from the client to each of the plurality of host computers, (iii) current load conditions on each of the plurality of host computers.

Still another embodiment of the invention is a computer communications network system. The computer communications network system includes: (a) a client computer with access to a plurality of Internet connections; and (b) a host computer configured to determine an allocation of data to be sent to the client computer over each of the plurality of Internet connections using at least one of (i) predetermined criteria and (ii) dynamically changing criteria.

As will be understood by those skilled in the art, a computer shall be construed broadly to include any type of computer based device. For example, in connection with the client computer described herein (such as client computer 802 in FIGS. 8-9), such a computer may be a server, a desktop computer, a laptop computer, a tablet, a mobile phone, or any other computer based device.

In the present application, the terms switchboard computer (e.g., in a hub mode), host computer (e.g., in a hub mode), and computer with switchboard hub, are used interchangeably.

BRIEF DESCRIPTION OF THE DRAWINGS

FIGS. 10A-10B are illustrations of a user interface allowing for the categorization of Internet connections by a user of a client computer in accordance with an exemplary embodiment of the invention.

Other features and advantages of the present invention are provided in the following detailed description of the invention, which refers to the accompanying drawings.

DETAILED DESCRIPTION OF THE PREFERRED EMBODIMENTS

The present invention provides in various exemplary embodiments, methods and systems for transmitting data between two computer networks, using multiple, potentially insecure or unreliable connections to deliver the effect of unifying the two networks as one secure network. In addition, it provides an improved method of establishing a virtual private network over insecure or unreliable connections.

Figure 1:
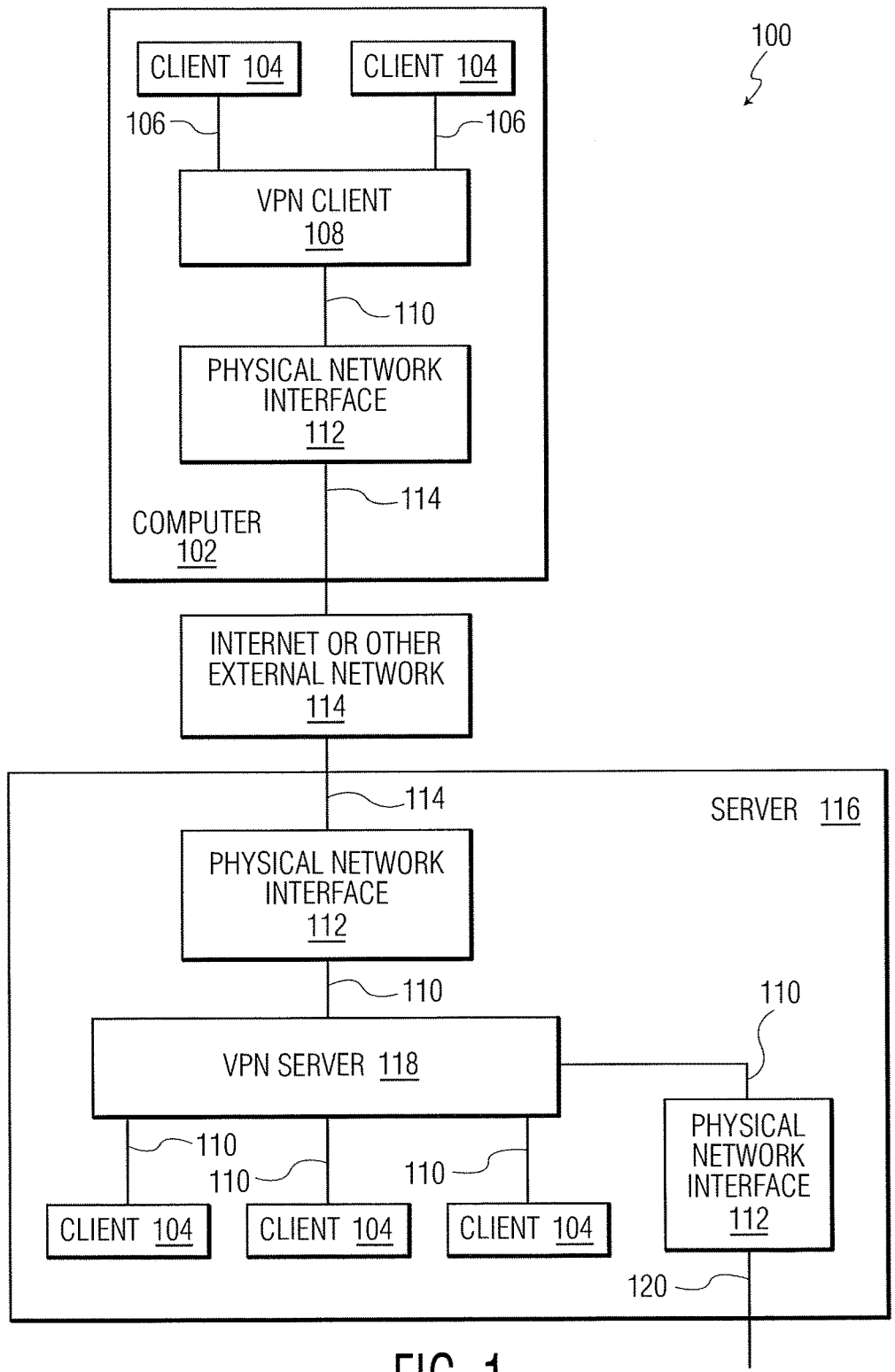
FIG. 1 illustrates an example prior art computer network architecture having a single VPN client and single VPN server.
Figure 2:
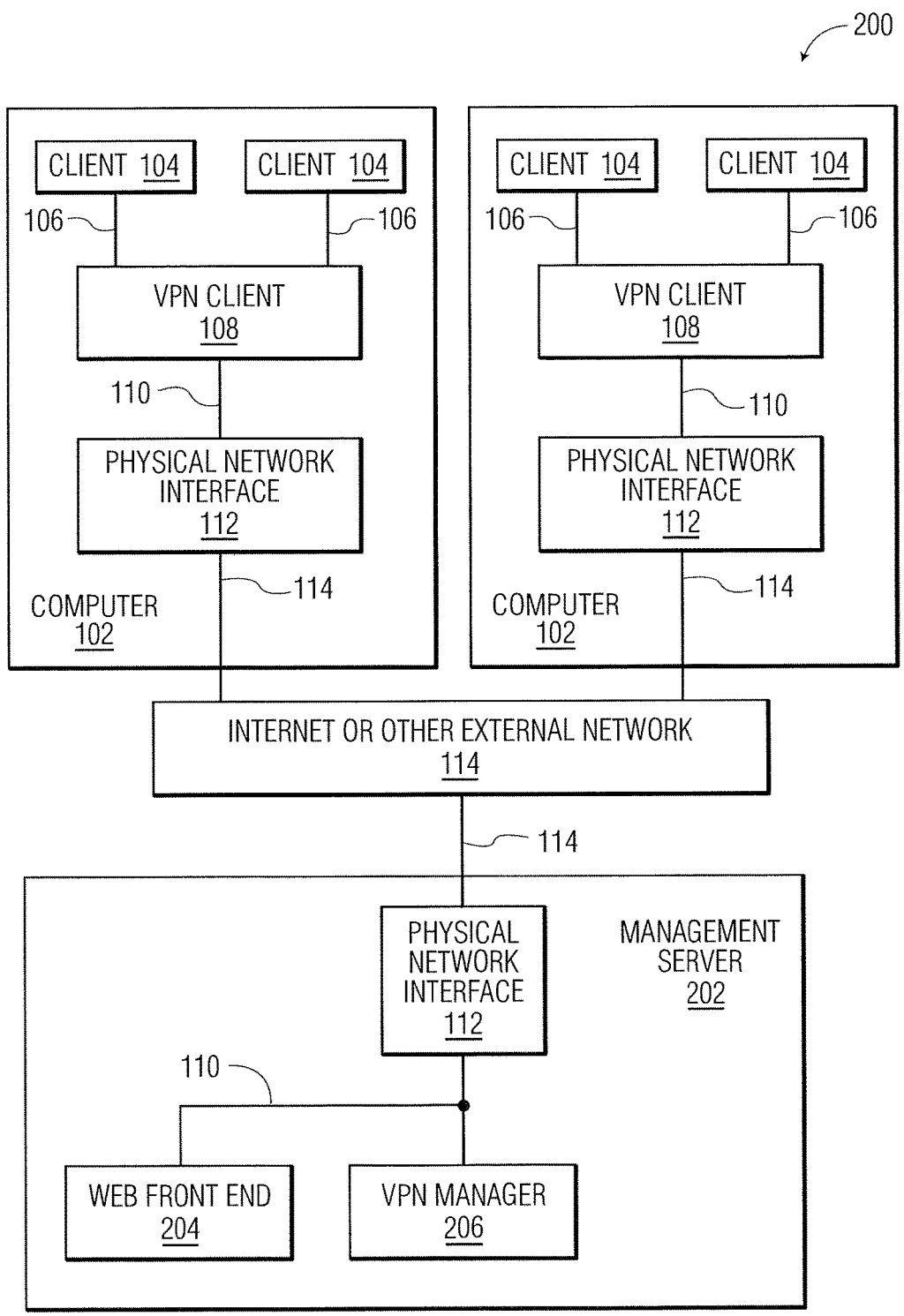
FIG. 2 illustrates an example prior art computer network architecture having more than one VPN client connected to a management server through the Internet.
Figure 3:
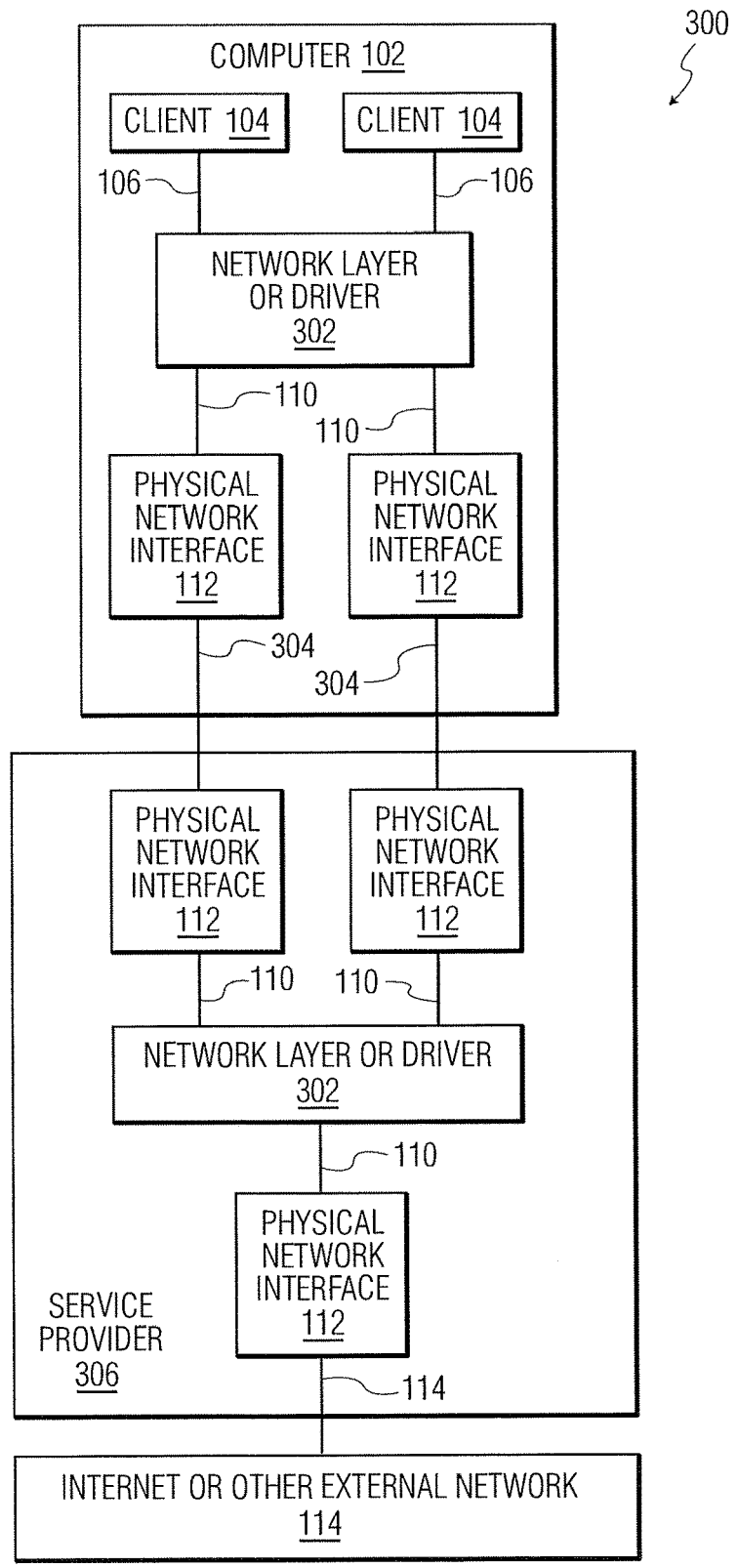
FIG. 3 illustrates an example prior art computer network architecture having a client computer connected to the Internet through a service provider.
Figure 4:
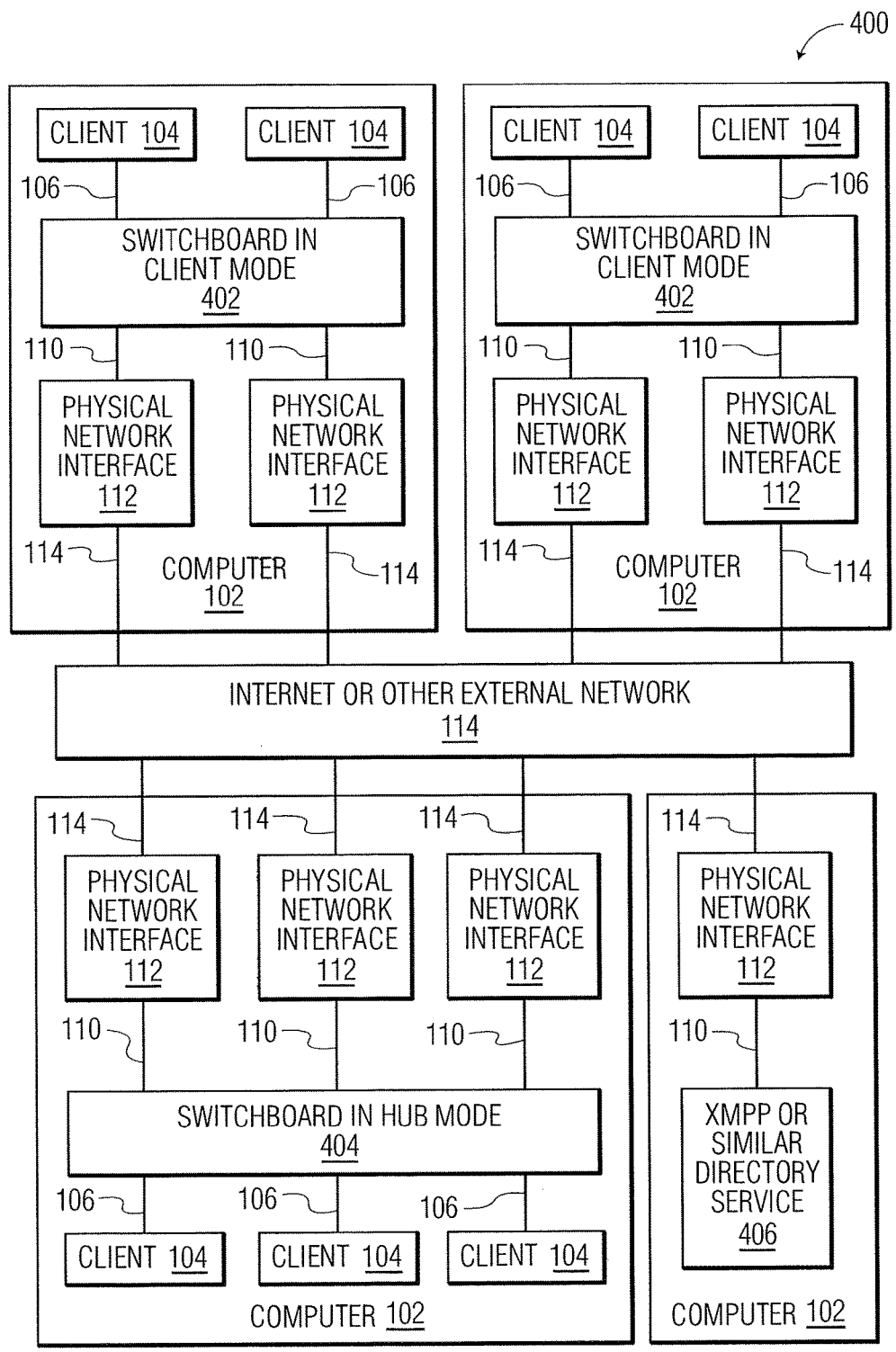
FIG. 4 illustrates the main components of a preferred embodiment of a "Switchboard" VPN network.

An exemplary embodiment of a switchboard network 400 system according to the present invention is illustrated in FIG. 4. The network consists of at least one switchboard in hub mode 404, one or more switchboards in client mode 402, and at least one an Extensible Messaging and Presence Protocol ("XMPP") or other similar directory service 406. The switchboard hub mode 404 is similar in some ways to a traditional VPN server, but more so it conceptually functions as a hub, similar to that in an Ethernet network. As such, the hub is not necessarily unique in a switchboard network, and there may be multiple hubs as well as multiple clients. The directory service can be an XMPP 406 or something similar in concept. The directory service can be completely private, hosted on a server appliance computer, or hosted on a public server such as Google Talk.

To describe the operation of an exemplary embodiment of the present inventive switchboard network, the computer 102 in hub mode 404 initiates making a connection to a directory service such as an XMPP 406, and registering that it (the computer 102 in hub mode 404) is available. The XMPP is an open protocol for real-time (e.g., instant) messaging over computer networks. The switchboard is well suited to using the XMPP protocols for directory-based discovery, but this is not the only possible service. Another similar service that might be used by the Switchboard is the Light Directory Access Protocol ("LDAP"). Potential clients may then access that service based on other security protocols, as applicable, and request connection to the switchboard network 400, via any number of independent physical interfaces 112 connected to one or more external public or private networks, such as the Internet 114.

Figure 5:
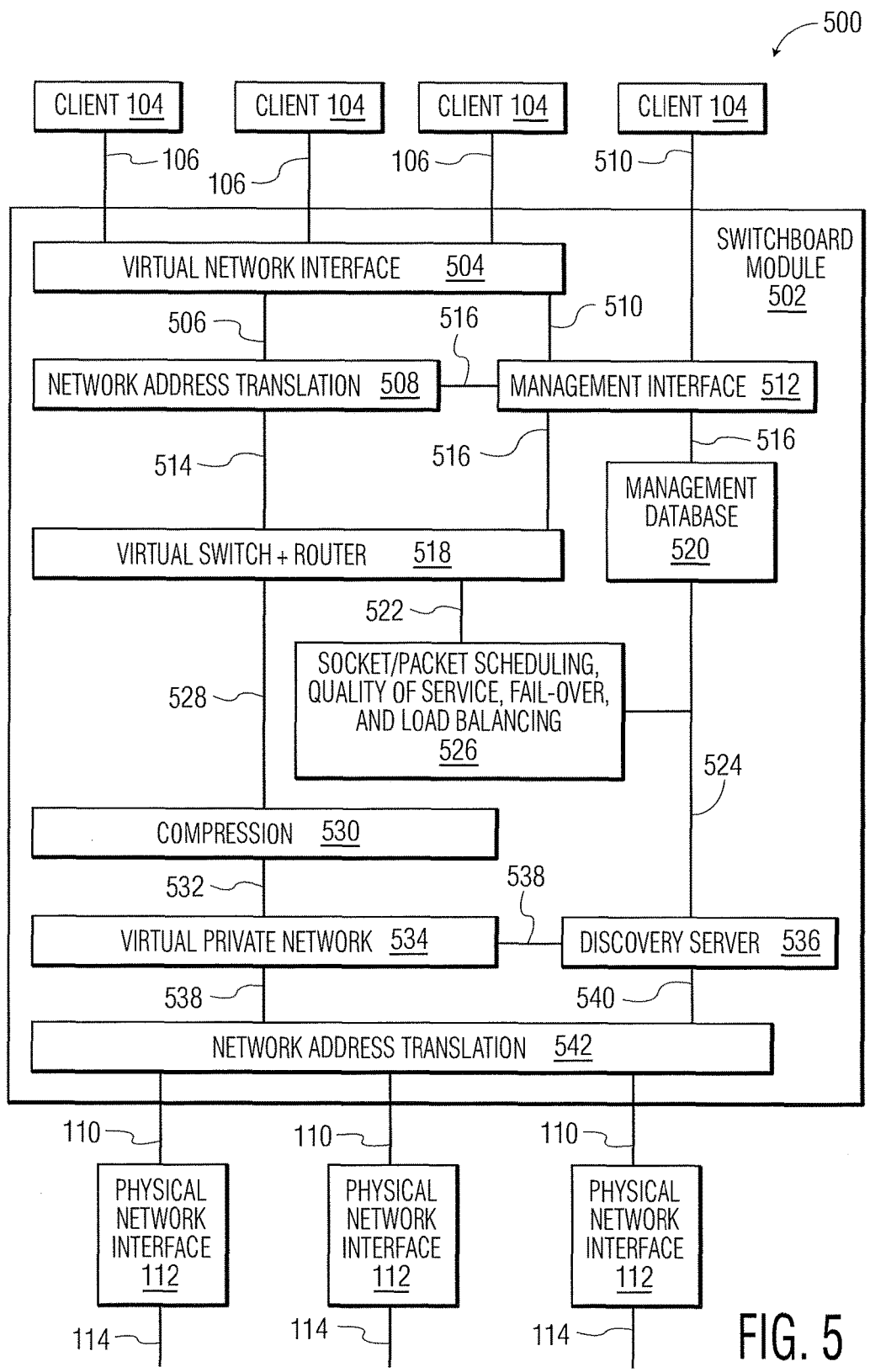
FIG. 5 illustrates the internal design of a preferred embodiment of the Switchboard module.

The detailed internals of an exemplary embodiment of the switchboard module 502 are shown in FIG. 5. The switchboard interface appears to a host computer as another Network Interface Card, via a virtual network interface 504 for the host operating system. A Management Interface process 512 is presented to adjust the behavior of the switchboard network, based on a local client 104 interface 510, such as an XML remote procedure call ("XML-RPC"). Behaviors are also modified by changes in the active system, discovery of clients or hubs via the Discovery Server 536, or statistics and other data, which is tracked in the Management Database 520.

The purpose of the Discovery Server 536 is to monitor external activity. The Discovery Server 536 will communicate with the centralized XMPP service 406, record changes to the clients 104 attached to a switchboard in server mode, and complete similar management functions.

The purpose of the Management Database 520 is to record current statistics and other information useful to the network. For example, the database 520 knows the cost, current performance, and expected reliability of every way of connecting between any two nodes in the network. Thus, as illustrated in FIG. 4, for a client 402 with two physical interfaces 112 connected to the Internet 114, communicating to a hub 404 with three physical interfaces 112 also connected to the Internet 114, the database 520 would track statistics on the six possible ways of establishing a connection between the client 402 and the hub 404.

The actual switchboard module 502 starts, as mentioned, with the virtual network interface 504. Traffic is routed 506 through a network address translation layer ("NAT") 508, which allows the host network address space to be independent of the internal routing decisions made by switchboard. The NAT 508 feeds 514 a virtual router/switch 518, which in the case of client mode will be bypassed. Data 524 from the Management Database 520 and the discovery server 536 inform the Socket Packet Scheduler 526. This Scheduler 526 takes into account quality of service, the number of active links between the hub and each client, the efficiency and cost of each link, and the global load on each hub link, to provide an optimal, packet by packet routing to each client over each available interface.

It is important to note that each physical link 114 to a client or hub is inherently dynamic. Interfaces may be added, removed, or simply go unreliable, and the switchboard system quickly adapts to any lost or added interfaces 112. So in a practical case, a laptop computer running a Switchboard client over Wi-Fi could be plugged into a gigabit Ethernet connection, and immediately boost the performance of on-going transactions. Or, a PC-Card or USB-based 3G modem could be added, and the laptop computer could then be taken mobile, again without disruption in on-going network transactions.

The output of the router 528 passes through an optional compression module 530. This layer will compress traffic 532 to the VPN 534 that will benefit from compression, and in the other signal direction, expand traffic 532 from the VPN 534 into the router. The VPN 534 itself applies encryption to each packet, then sends it down the appropriate Internet Protocol tunnel 538 to another Network Address Translator 542. This second NAT translates the VPN packet addresses to match the network conventions of the physical network interfaces 112. VPN packets are then sent 110 to the appropriate NICs 112, and then on to each respective network 114.

A packet being received by a hub 404 or client 402 follows this path in reverse. The external network 114 delivers a packet to one or more of the physical interfaces 112. These are VPN packets, which contain the encrypted private network packets. These run through a NAT 542 and on to the VPN 534 manager. This layer will dismantle the VPN, decrypt the payload, and collect complete data packets. These are then sent on 532 to the compression module 530 and decompressed if possible.

If operating in a hub mode node, the packet is sent 528 to the router module 518, and perhaps sent back out to another client node, depending on the routing information for that node. Again, this is optimized in the packet scheduler 526, by analysis of the performance for all possible links, the quality of service for the particular packet, reliability of each outgoing link, and load balancing of all traffic across the hub.

When the switchboard module is in client mode, the router 518 is bypassed and the packet is sent directly to the local side NAT 508. Similarly, if this is a packet destined for the hub's local network, the router directs it on 514 to the local side NAT 508. Network addresses are rationalized here for the local network 106, and eventually get routed to local client programs, or possibly back to the Internet via a hub firewall.

Figure 6A:
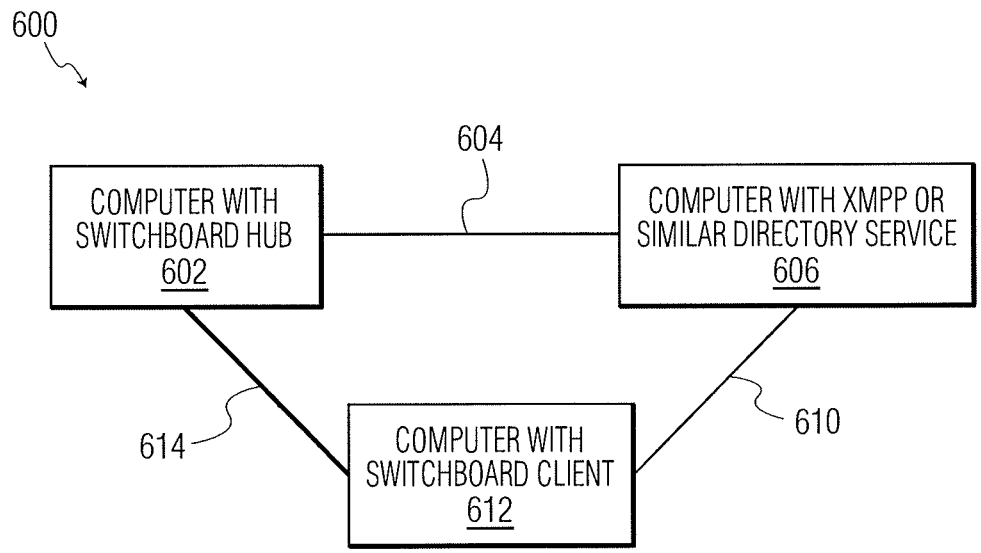
FIG. 6A illustrates a preferred embodiment of one mode of client to hub connection via the XMPP or other directory protocol.
Figure 6B:
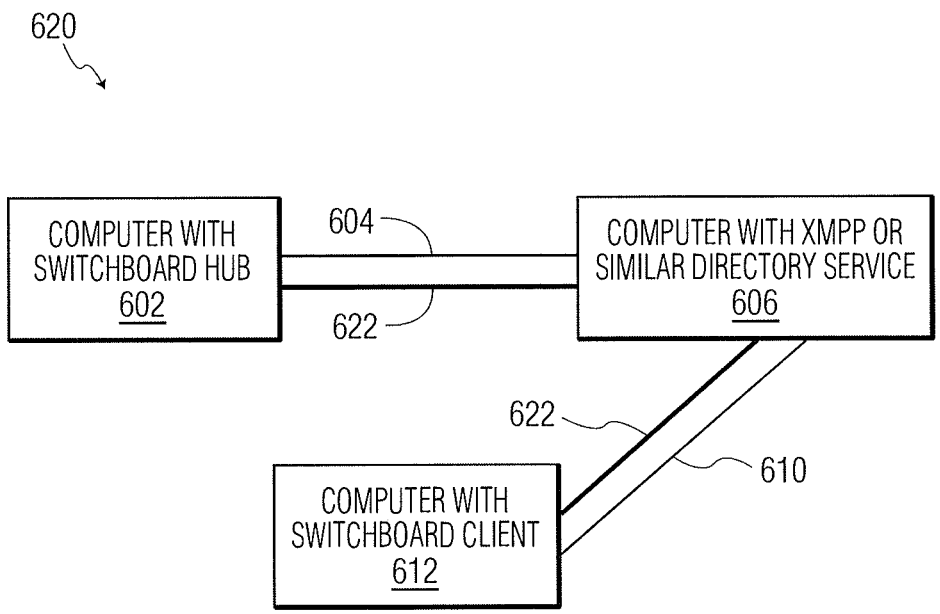
FIG. 6B illustrates another preferred embodiment of another mode of client to hub connection via the XMPP or other directory protocol through a two-hop network.

FIG. 6A and FIG. 6B illustrate some aspects of the discovery server 536 described above. As shown in FIG. 6A, a peer-to-peer 600 network may be established between any two of the multiple connections possible on switchboard enabled devices. The hub 602 registers 604 with an XMPP service 606, which can be public or private. The client 612 will, at a later time, contact the XMPP or other directory service 606 and ask for a connection to the switchboard hub 602. These are general purpose protocols inherent in XMPP. In other words, the XMPP service 606 knows nothing specific about the network being established by the switchboard.

In the case of XMPP, the XMPP service 606 will interrogate the client 612 and hub 602, and attempts to establish a peer-to-peer link 614 between the two computers. This uses the Jingle protocol, which is intended to encapsulate multimedia data between two systems. Since the Jingle protocol itself does not care about specific contents, the switchboard is taking advantage of this mechanism for real-time streaming to make the VPN connection 614 without the usual complexity of setup.

Jingle connections are setup via the open Interactive Connectivity Establishment ("ICE") methodology, which can usually manage the complexities of NAT traversal, and thus create the peer-to-peer connection 614 shown in FIG. 6A. But when ICE cannot establish the connection, the XMPP service 606 can act as an intermediary, creating a two-hop network 620, as shown in FIG. 6B. Based on the fact that the client 612 and hub 602 have connected to the XMPP service, the ICE protocols can manage a hop 622 through the XMPP service 606, because the XMPP service 606 device can be seen by, or be communicating with, both the client 612 and hub 602.

It is important to note that the Jingle protocol establishes rapid transport protocol ("RTP") connections, which are ideal for media streaming, not Transmission Control Protocol/Internet Protocol ("TCP/IP") connections. TCP/IP connections are normally desired for 2-way data communications, where every data packet sent is acknowledged as received. Such acknowledgement of receipt is not undertaken with RTP connections. This would normally be a problem for a data link such as the switchboard VPN. However, the Switchboard VPN is already managing the possibility of faulty links, and is doing so at a high level. As such, this equates to being an advantage to the switchboard protocol.

The TCP/IP protocol works great for a reliable or mostly reliable connection. But as packet failures increase, a network can get swamped by retry packets. Moving the management of these problems to a higher, multi-network view in a switchboard, more intelligent decisions can be made about lost packets. Such lost packets could get routed via a different network connection. For example, a lower priority connection might receive a request for multiple missing packets, for transmission efficiency. Similarly, a critical channel that has not yet failed may be moved to a more reliable connection, lowering the traffic burden on the failing connection. In short, the media-friendly connection is actually an advantage for switchboard's means of implementing the VPN.

Figure 7:
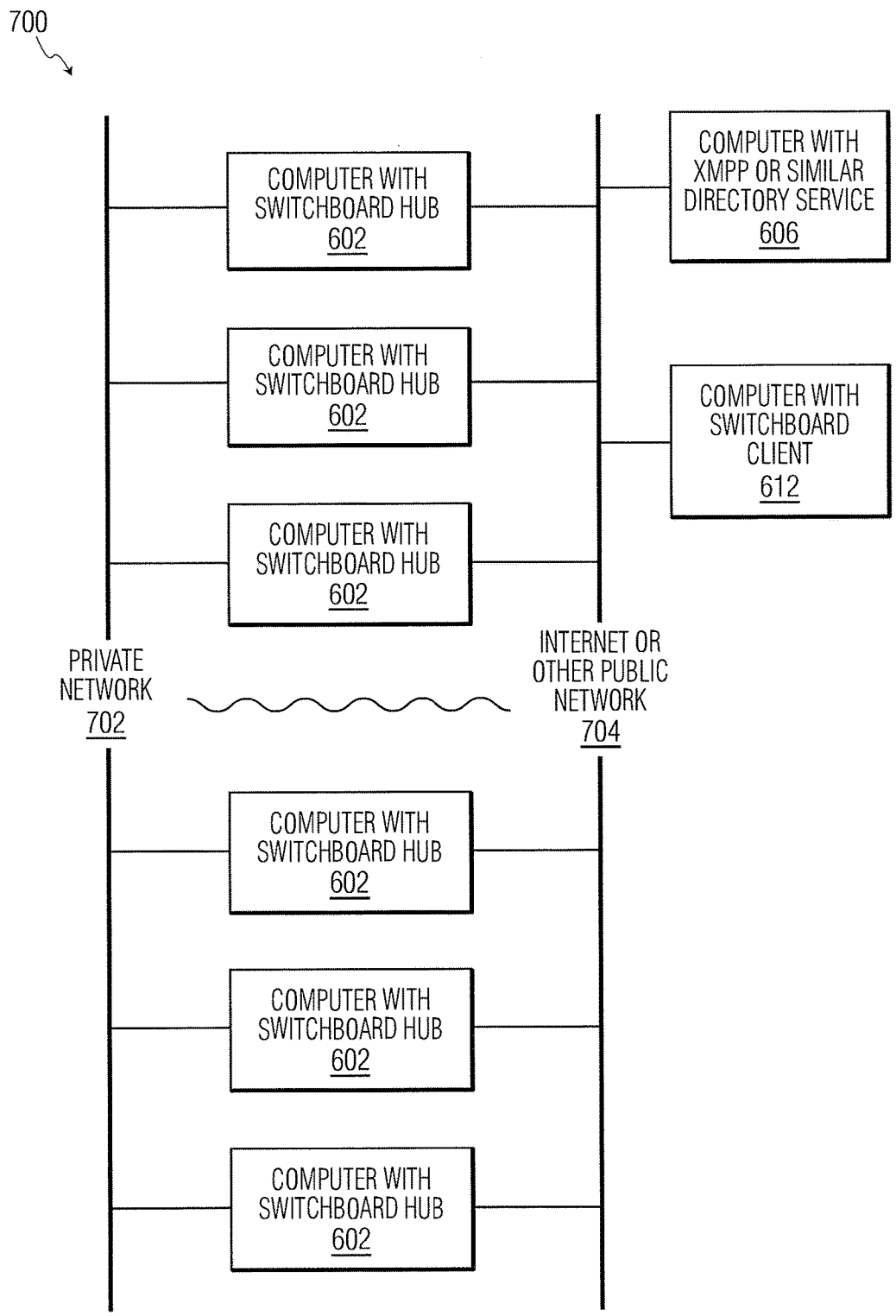
FIG. 7 illustrates an exemplary embodiment of a large private network with multiple hub access points.

Yet another aspect of the invention is, as mentioned, the non-uniqueness of the hub, versus a server in some prior VPN systems. As shown in FIG. 7, the switchboard architecture can be readily scaled up to very large networks. A large private network 702 may have many different points of access, via switchboard hubs 602, to a public network such as the Internet 704. A switchboard client 612 may accordingly gain access to the private network via any hub 602.

In such a network, the directory service 606 will automate the optimization of this connection. The directory 606 itself is periodically updated with statistical information about each hub it lists, including performance and load statistics. The client 612, when engaged with the directory service 606 in the discovery process, will be able to select an optimal hub 602, based on the load of the hub 602 and the cost and performance of connection between client 612 and hub 602.

As described above, the inventive system and methods are able to improve the performance of the VPN connection. This is in part resulting from the ability of the computer network to dynamically schedule virtual network traffic over any and/or all available network interfaces, on a packet-by-packet basis. Moreover, in preferred embodiments, the inventive computer network is capable of monitoring its own performance, and using point-to-point performance of each system-to-system path, monitor overall load of the entire VPN, as well as cost and reliability of each connection, and priority of each socket connection to automatically create optimized networks that can significantly improve performance, cost, and reliability of the VPN connections.

As will be appreciated by those skilled in the art, people desire high speed, low cost, reliable Internet connectivity; however, the actual Internet connections to which they have access are sometimes slow, expensive or unreliable. According to certain exemplary embodiments of the invention, accessible Internet connections are bonded together to create a single bonded connection that is faster and more reliable than any of the individual connections, and which is cost aware to avoid using too much data on an expensive connection(s). Costs may be defined at different levels, so that the higher cost connection can be used to enhance the lower cost connection, for example, when extra bandwidth is needed, or when the lower cost connection is underperforming, but still connected.

In a very specific example, regarding a user of Internet connectivity via his/her mobile device (e.g., a mobile phone, a tablet, etc.), the invention may be used to provide seamless connectivity. For example, the inventive systems and methods may favor a WiFi connection over a more expensive mobile phone connection, but can transfer streams (sockets) from the WiFi to the mobile and back, for example, if there is an interruption in WiFi service or performance. As will be appreciated, the inventive systems and methods may be very useful in combining multiple lower quality Internet connections accessible by a user (e.g., accessible by a client computer). A non-limiting list of exemplary Internet connections include Wifi connections, DSL connections, satellite connections, ethernet connections, 4G connections, etc.

According to certain exemplary embodiments of the invention, computer communication network systems (and corresponding methods) are provided that dynamically consider criteria such as, for example, bandwidth, latency, loss and costs in the determination of allocation of data between multiple Internet connections accessible by a user. Further, such systems and methods may consider cost between multiple Internet connections accessible by a user in a non-binary (use or not-use) manner. For example, users (e.g., users of a client computer system with access to multiple Internet connections) may categorize the multiple Internet connections, with the categorizations being considered in the dynamic allocation of data between the multiple Internet connections. In one instance, a user may identify one link (i.e., an Internet connection) as being Primary, and another link as a Secondary, where the Secondary Internet connection may be used when the Primary connection is congested.

In accordance with certain exemplary embodiments of the invention, a user does not need to configure the "Weights" of the connections. For example, the systems and methods (including software) can dynamically determine the changing criteria (e.g., statistics), and can adjust the data allocation between the multiple Internet connections on the fly (i.e., dynamically) as connections change (e.g., connections changing because a user is moving, connections changing because of load on the connections, etc.).

Figure 8:
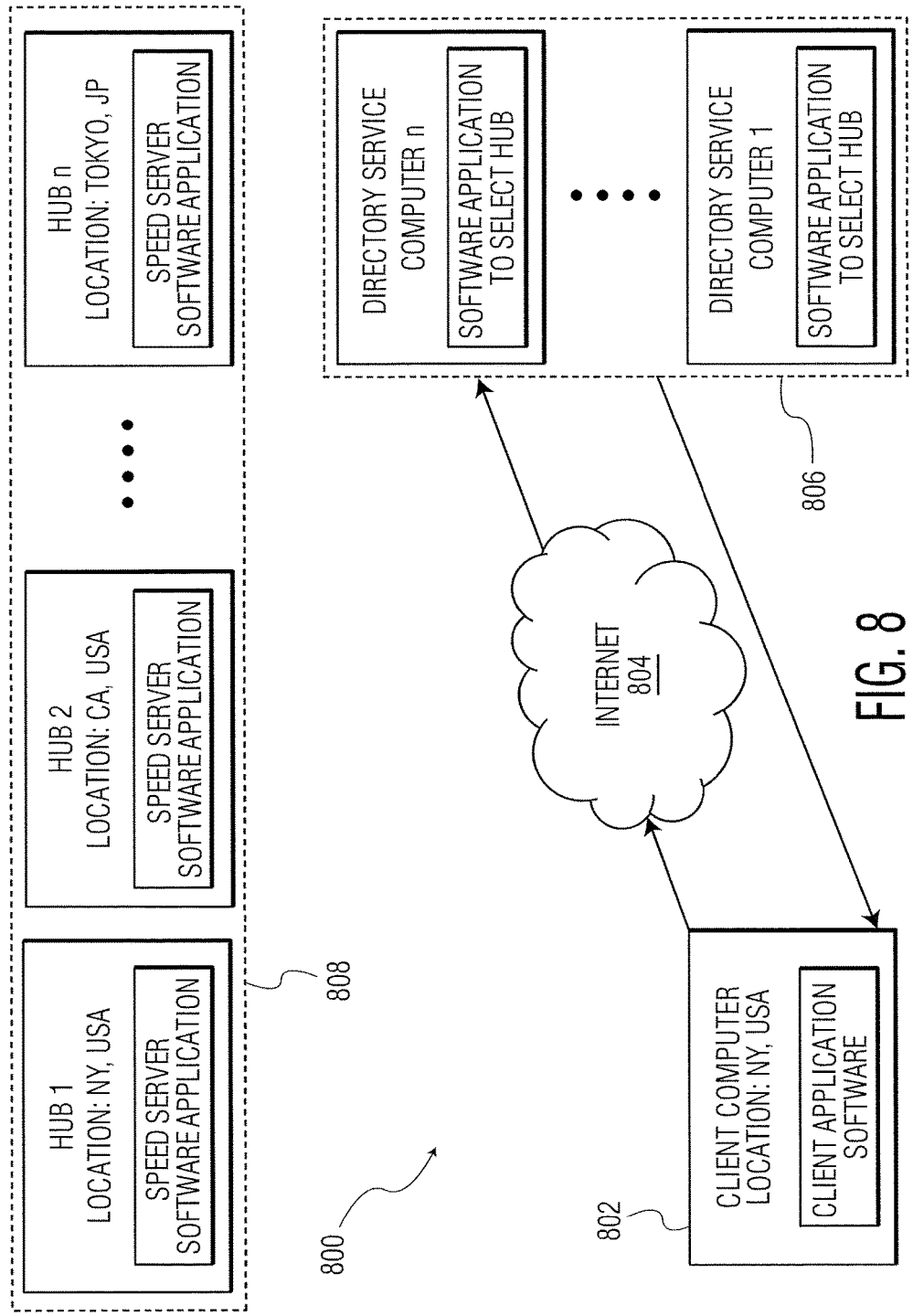
FIG. 8 is a block diagram illustration of a computer communications network system in accordance with an exemplary embodiment of the invention.

FIG. 8 illustrates a computer communications network system 800. System 800 includes a client computer 802 with access to a plurality of Internet connections (see, for example, Internet connections 1 and 2 in FIG. 9). It is desirable to allocate the distribution of data to be sent to, and to be received from, client computer 802 over each of the plurality of Internet connections. This allocation is determined using, for example: software installed on (and/or accessible by) the client computer; and software installed on (and/or accessible by) one of a plurality of host computers 800. FIG. 8 illustrates a plurality of host computers 808. The plurality of host (switchboard) computers 808 includes Hub 1 (i.e., a host computer located in New York), Hub 2 (i.e., a host computer in California), and Hub n (i.e., a host computer in Tokyo). As will be appreciated by those skilled in the art, the plurality of host computers 808 may include any number of host computers, in any of a number of locations, throughout the world.

Each of the host computers (i.e., hubs) included in group 808 includes a speed server software application (either installed on, or accessible by, the corresponding host computer). This speed server software application allows for the allocation of data to be sent to client computer 802 over each of the plurality of Internet connections, for example, using at least one of (i) predetermined criteria and (ii) dynamically changing criteria. Thus, one of the computers/hubs among the plurality of host computers 808 shall be selected for performing this allocation.

As shown in FIG. 8, a plurality of directory service computers 806 (including directory service computers 1 through n) are provided. One of the plurality of directory service computers is selected, for example, based on a geographic location of the client computer. For example, one of the directory service computers that is geographically close to client computer 802 may be selected. This determination is made by client computer 802 accessing ones of the plurality of directory service computers using Internet 804.

After the selection of one of the directory service computers, one of a plurality of host computers 808 is selected (e.g., by a user of the client computer from a list of available host computers, directly by the directory service computer, etc.) to assist in allocation of data sent to client computer 802 over each of the plurality of Internet connections. This selection of one of a plurality of host computers 808 is based on criteria, the criteria including at least one of (i) a relative geographic location between the client computer and the plurality of host computers, and (ii) current load test traffic from the client to each of the plurality of host computers, (iii) current load conditions on each of the plurality of host computers. For example, each of the plurality of host computers 808 may "publish" messages about its availability. Such messages may provide information regarding the current load conditions on each of the plurality of host computers. With this information, the selected directory service computer identifies "available" ones of the plurality of host computers (e.g., a group of 5 available host computers), such that a user of the client computer may select one of the available host computers. Selection criteria (e.g., geographic location, numbers of current users, etc.) may be provided along with each of the identified, available, host computers. In certain embodiments of the invention, a desired one of the plurality of host computers 808 may be selected directly by the directory service computer (and not by the user of the client computer). In any event, the selected host computer is able to determine the allocation of data to be sent to the client computer over each of the plurality of Internet connections.

Figure 9:
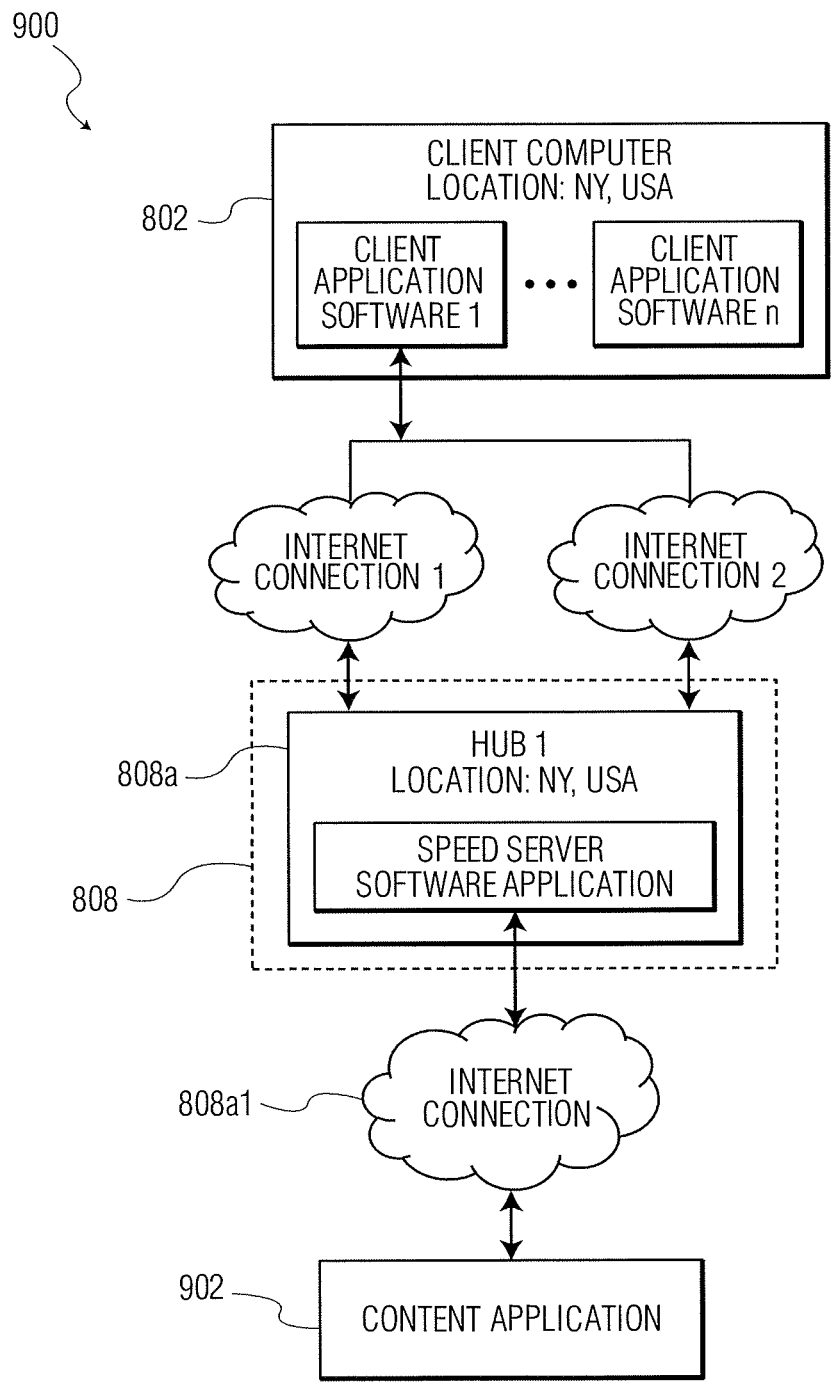
FIG. 9 is another block diagram illustration of a computer communications network system in accordance with an exemplary embodiment of the invention.

FIG. 9 illustrates a computer communications network system 900, in a scenario where Hub 1 (located in New York) has been selected as the host computer 808*a* from the plurality of host computers 808. More specifically, FIG. 9 illustrates various software applications installed on (or accessible by) client computer 802. These software applications include "CLIENT APPLICATION SOFTWARE 1" through "CLIENT APPLICATION SOFTWARE n". As is illustrated through the dotted line leading from "CLIENT APPLICATION SOFTWARE n" to "CLIENT APPLICATION SOFTWARE 1" in FIG. 9, the information from (and to) the software applications other than "CLIENT APPLICATION SOFTWARE 1" all pass through "CLIENT APPLICATION SOFTWARE 1". "CLIENT APPLICATION SOFTWARE 1" is the software application that performs the allocation of data from client computer 802 through each of Internet connection 1 and Internet connection 2.

"CLIENT APPLICATION SOFTWARE 1" allocates the data between Internet connection 1 and Internet connection 2, and this data then passes through Hub 1 (host computer 808*a* of the plurality of host computers 808), and then along Internet connection 808*a*1 to content application 902. A user of client computer 802 may want to receive content from content application 902. For example, one of the client software applications (such as CLIENT APPLICATION SOFTWARE n) may desired to retrieve content (at least temporarily, such as through streaming) from content application 902. This content is allocated between Internet connection 1 and Internet connection 2 (on its way to client computer 802) by the speed server software application installed on (or accessible by) host computer 808*a* (Hub 1).

Regardless of whether content is being sent by client computer 802, or if content is being received by client computer 802, the allocation of such content (data) between Internet connection 1 and Internet connection 2 is determined based on certain criteria (where the criteria may differ if the content is being sent from, or received by, the client computer). Such criteria may include (i) predetermined criteria and/or (ii) dynamically changing criteria. Examples of predetermined criteria include: (a) cost information related to usage of each of the plurality of Internet connections (e.g., some connections may have a fixed cost that does not vary, while others may involve use based costs, etc.); and (b) categorization of the plurality of Internet connections by a user of the client computer.

FIGS. 10A-10B are examples of a user interface by which a user may "categorize" the plurality of Internet connections. For example, such a user interface may be viewed (and adjusted) on client computer 802, or may viewed (and adjusted) on another device (e.g., a portable device of the user). FIG. 10A relates to Internet connection 1, which is a WiFi connection in this example. This is an "UNLIMITED USE" connection, for example, because the user pays a fixed amount for the connection. Therefore, in the "PRIORITY" section of the interface, the user has selected "ALWAYS" as the appropriate categorization. FIG. 10B relates to Internet connection 2, which is a 4G connection in this example. For this connection, the user has 2 GB allocated over a predetermined period of time (e.g., where the data limits may be a daily limit, a monthly limit, etc.). In this example, the user has used 1.3 GB (65%) of the 2 GB allocation. The user may consider Internet connection 2 a reliable connection, but since the user does not have unlimited access to this connection, the user has selected "SECONDARY" as the appropriate categorization from the "PRIORITY" section of the interface.

In connection with the invention, when a data limit (e.g., a daily limit, a monthly limit, etc.) for a given Internet connection is exceeded, that connection may be deemed unavailable, or the speed of that connection may be limited (e.g., such that transmission of content such as text messaging is enabled, but video streaming may not be enabled, etc.).

While FIG. 9 (and FIGS. 10A-10B) illustrate 2 Internet connections which may be accessed by the user, it is understood that additional (or different) connections could be available, and the availability of connections is dynamic and can change over time.

Thus, in accordance with exemplary embodiments of the invention, Internet connectivity speed and/or reliability may be substantially improved by combining multiple Internet connections. The systems disclosed herein (including software on the appropriate computer) manage and/or organize: allocation of outgoing data packets (e.g., using the software on, or accessible by, the client computer) sent on the available Internet connections; and allocation of incoming data packets (using the software on, or accessible by, the host computer) received by the client computer sent on the available Internet connections. Local and remote instances may communicate to acknowledge received packets, or to request lost packets be retransmitted.

Allocation of the data over the plurality of Internet connections involves consideration of certain criteria. For example, Internet connections have different bandwidths, latency, loss, and jitter—and these factors influence how data packets may desirably be distributed among the plurality of Internet connections. Further, certain criteria and statistics related to each of the plurality of Internet connections may change over time. Further still, ones of the plurality of Internet connections may have different costs, data limits, and/or user defined categorization (e.g., see FIGS. 10A-10B).

Further still, allocating too much data traffic to a given Internet connection may cause "network congestion", causing the connection to slow down. That is, an increase in data transmissions using an Internet connection may result in a proportionately smaller (or even a reduction in) throughput. Thus, when an Internet connection is congested, the more data one tries to send, the less data is actually successfully sent.

For each desired one of the plurality of accessible Internet connections, dynamically changing criteria (e.g., metrics) are tracked to keep a real time evaluation of the state of the Internet connection. One such criteria is latency (e.g., the time difference/interval between send and receive)—where the latency may be monitored/calculated for each individual data packet based on sent time, received time, and time difference. Another such criteria is lost packet information (e.g., track the number of lost packets over a time window). Another such criteria is the "In Flight Window", that is, the Inflight Window is the maximum value for the number of bytes currently in flight—where each time a data packet is sent it may be added to the number of bytes that are inflight—when it arrives and acknowledgement of arrival is received, it may be subtracted from the number of bytes that are inflight.

Another dynamically changing criteria is network congestion, which may be detected, for example, using latency and/or loss. For example, if the system monitors for loss, and if there are multiple consecutive instances of loss, this may be termed network congestion. If the system monitors for latency, the current latency value may be compared to the minimum latency observed over a time window. If the latency increases by a certain multiplier (e.g., determined from the amount of latency and/or variability of latency) of the minimum, then this may be termed network congestion.

In connection with sending outgoing data packets (e.g., data sent from the client computer, such as client computer 802 in FIGS. 8-9), the available Internet connections may first be filtered by criteria. An example approach to the criteria, in order, is now provided. A first consideration may be the Priority/Cost of the various Internet connections as categorized by the user of the client computer (e.g., see FIGS. 10A-10B including priority categorizations such as "ALWAYS", "SECONDARY", "BACKUP", and "NEVER"). The "ALWAYS" categorization may be considered for use all of the time, at least if the connection is available/connected. The "SECONDARY" categorization should be used less than "ALWAYS", and may be started when the primary (i.e., "ALWAYS") Internet connection is congested or not working. Once turned on, the "SECONDARY" connection may be used until the total data being carried by all Internet connections is less than what is considered to be needed to congest the primary connections. The "BACKUP" categorization relates to connections typically used only if the "ALWAYS" and "SECONDARY" connections are not working. The "Never" categorization is for connections that are not to be used.

A second consideration (after the first consideration of Priority/Cost described above) relates to the dynamic quality of the connection. For example, poor connections may be used only redundantly until they perform better. That is, if a connection has a much higher latency or a much lower speed compared to another connection, combining them to achieve maximum speed might not be possible. In such a case, the slower/more latent connection may automatically be used as a redundant connection. By using the connection redundantly, instead of ignoring the connection altogether, the metrics of the connection are continuously monitored to determine when (and if) its performance has improved enough to use it normally again.

A third consideration may relate to whether the Inflight Window is full or not. If the Inflight Window is full on a connection, it can not accept any more data packets without putting it in danger of exceeding the limits of the connection and resulting in lower performance. Thus, such a connection may not be used to send more data packets until there is sufficient space in the Inflight Window (i.e., as determined by previously sent packets being acknowledged). If the Inflight Window is full on all connections, incoming packets may be dropped to indicate the system has reached the maximum capacity.

A fourth consideration relates to selection algorithms. For example, smart bonding of Internet connections may involve randomly distributing data packets into connections weighted by remaining bytes in the inflight window. In another example, involving redundancy, copies of data packets may be sent over multiple connections at the same time and delivers the one that arrives first. In such a case, matching with the speed of the fastest connection may be done, with the slower connection(s) taking copies of the data packets, but staying below the congestion level. Thus, some of the data packets are only sent once, but the problem of slow connections slowing down transmission may desirably be avoided.

In connection with receiving incoming data packets (e.g., data sent to the client computer, such as client computer 802 in FIGS. 8-9), packet reordering may desirably be utilized. Each data packet may have two sequence numbers. A first sequence number may be a tunnel sequence number, Tunnel SN (which is the total one, used to reorder) (where the Tunnel refers to the virtual channel including the bonded connections, considered as a single connection from the perspective of the content provider that provides data to the client computer). A second sequence number is a per Internet connection sequence number Connection SN (which is used to detect LOST packets). Because data packets are sent over multiple Internet connections with potentially different latencies, packets may arrive in a different order than they were originally sent. A data packet may be buffered at the receiver until all packets originally sent before it have been delivered.

Data packets may also be retransmitted. That is, attempts may be made to retransmit lost data packets. According to certain exemplary embodiments of the present invention, missing data packets may be resent, unless too many data packets are dropped (which is indicative of congestion and trying to send more packets would only add to the congestion). For example, a predetermined number of retransmission attempts may be made before retransmission efforts are abandoned. For example, if retransmission is abandoned, a message may be sent indicating the abandonment, and indicating which packets have been lost, such that the packets can be removed from a send buffer. The sender may be required to maintain a buffer of sent packets until it receives acknowledgement from the receiver that the packet was received.

If a data packet does not arrive, a time delay may be used before the data packet is declared missing (e.g., because data packets may be arriving out of order). Such a time delay may be based on latency, and variability of latency, to determine how long to wait for a data packet to arrive. When the time delay (i.e., a wait time) expires, if the data packet has not arrived, it may be considered lost.

While the present invention is described herein with reference to illustrative embodiments for particular data communication applications, it should be understood that the invention is not limited to those embodiments described. Those having ordinary skill in the art and access to the teachings provided herein will recognize additional applications and embodiments, further modifications, and certain substitution of equivalents, all of which are understood to be within the scope of the claimed invention. Accordingly, the invention is not to be considered as limited by the foregoing description.

What we claim is:

1. A method of distributing data over multiple Internet connections, the method comprising the steps of:

(a) defining criteria for allocating data to be sent over a plurality of Internet connections accessible by a client computer, the criteria including (i) predetermined criteria and (ii) dynamically changing criteria, the predetermined criteria including categorization of the plurality of Internet connections by a user of the client computer including the user identifying one of the plurality of Internet connections as a primary connection and another of the plurality of Internet connections as a secondary connection, the dynamically changing criteria relating to at least one (i) Internet connection bandwidth, (ii) latency of transmission of data packets, and (iii) loss of data packets;

(b) configuring a host computer for determining an allocation of data to be sent to the client computer over each of the plurality of Internet connections using the predetermined criteria and the dynamically changing criteria, wherein step (b) includes selecting the host computer from a plurality of host computers based on criteria of the host computer, the criteria of the host computer defined to include at least one of (i) a relative geographic location between the client computer and the plurality of host computers, and (ii) current load test traffic from the client computer to each of the plurality of host computers, (iii) current load conditions on each of the plurality of host computers;

(c) configuring the client computer for determining an allocation of data to be sent to the host computer over each of the plurality of Internet connections using the predetermined criteria and the dynamically changing criteria;

(d) dynamically distributing data, using the allocation of data determined by each of the host computer and the client computer, over the plurality of Internet connections, thereby using the plurality of Internet connections as a bonded connection to dynamically provide improved Internet connectivity that is more reliable and cost effective than a single one of the plurality of Internet connections.

2. The method of claim 1 wherein the client computer is configured to run a software application configured to determine the allocation of data to be sent from the client computer over each of the plurality of Internet connections to the host computer.

3. The method of claim 2 wherein the software application is installed on the client computer.

4. The method of claim 1 wherein the host computer is configured to run a software application configured to determine the allocation of data to be sent to the client computer over each of the plurality of Internet connections.

5. The method of claim 2 wherein the software application is installed on the host computer.

6. The method of claim 1 wherein the predetermined criteria includes cost information related to usage of each of the plurality of Internet connections.

7. The method of claim 1 further comprising the step of accessing a directory service computer based on a geographic location of the client computer, and (c) using the accessed directory service computer to select the host computer from the a plurality of host computers based on the criteria.

8. The method of claim 7 wherein the step of selecting the directory service computer includes selecting the directory service computer from among of plurality of directory service computers based on the geographic location of the client computer.

9. The method of claim 7 wherein each of the plurality of host computers publishes messages related to its availability, and wherein such messages are used by the directory service computer in the selection of the one of the plurality of host computers.

10. A computer communications network system comprising:

a client computer with access to a plurality of Internet connections; and a host computer configured to dynamically determine an allocation of data to be sent to the client computer over each of the plurality of Internet connections using criteria, the criteria defined to include (i) predetermined criteria and (ii) dynamically changing criteria, the host computer being selected from a plurality of host computers based on criteria of the host computer, the criteria of the host computer defined to include at least one of (i) a relative geographic location between the client computer and the plurality of host computers, and (ii) current load test traffic from the client computer to each of the plurality of host computers, (iii) current load conditions on each of the plurality of host computers, the client computer being configured for determining an allocation of data to be sent to the host computer over each of the plurality of Internet connections using the predetermined criteria and the dynamically changing criteria, whereby the plurality of Internet connections are used as a bonded connection to dynamically provide improved Internet connectivity that is more reliable and cost effective than a single one of the plurality of Internet connections, the predetermined criteria including categorization of the plurality of Internet connections by a user of the client computer including the user identifying one of the plurality of Internet connections as a primary connection and another of the plurality of Internet connections as a secondary connection, the dynamically changing criteria relating to at least one (i) Internet connection bandwidth, (ii) latency of transmission of data packets, and (iii) loss of data packets.

11. The computer communications network system of claim 10 further comprising at least one directory service computer for selecting the host computer from among a plurality of host computers based on criteria, the criteria including at least one of (i) a relative geographic location between the client computer and the plurality of host computers, and (ii) current load test traffic from the client to each of the plurality of host computers, (iii) current load conditions on each of the plurality of host computers.

* * * * *